(12) United States Patent
Lendenmann et al.

(10) Patent No.: US 8,432,121 B2
(45) Date of Patent: Apr. 30, 2013

(54) METHOD AND APPARATUS FOR CONTROL OF ELECTRICAL MACHINES

(75) Inventors: Heinz Lendenmann, Vasteras (SE); Rahul Kanchan, Vasteras (SE); Hector Zelaya De La Parra, Vasteras (SE); Luca Peretti, Västerås (SE)

(73) Assignee: ABB Research Ltd. (CH)

( * ) Notice: Subject to any disclaimer, the term of this patent is extended or adjusted under 35 U.S.C. 154(b) by 130 days.

(21) Appl. No.: 12/983,616

(22) Filed: Jan. 3, 2011

(65) Prior Publication Data

US 2011/0163707 A1   Jul. 7, 2011

Related U.S. Application Data

(63) Continuation of application No. PCT/EP2008/067930, filed on Dec. 18, 2008.

(30) Foreign Application Priority Data

Jul. 3, 2008 (SE) ........................ 0801590

(51) Int. Cl.
*H02P 1/46* (2006.01)
*H02P 3/18* (2006.01)
*H02P 6/00* (2006.01)

(52) U.S. Cl.
USPC ............. 318/701; 318/432; 318/434

(58) Field of Classification Search ......... 318/701, 318/432, 434
See application file for complete search history.

(56) References Cited

U.S. PATENT DOCUMENTS 6,724,168 B2 * 4/2004 Cheong et al. ............... 318/701
2002/0149332 A1   10/2002 Inagaki et al.

FOREIGN PATENT DOCUMENTS

WO   0025418 A1   5/2000

OTHER PUBLICATIONS

International Search Report and Written Opinion of the International Searching Authority; PCT/EP2008/067930; Apr. 2, 2009; 13 pages.
Bolognani, et al.; "Self-tuning of MTPA current vector generation scheme in IPM synchronous motor drives"; Power Electronics and Applications, 2007 European Conference; Sep. 2-5, 2007; pp. 1-10 (abstract only).

* cited by examiner

*Primary Examiner* — Erick Glass
(74) *Attorney, Agent, or Firm* — St. Onge Steward Johnston & Reens LLC

(57) ABSTRACT

A method for finding an operating point of an electric motor which includes the steps of generating a perturbation signal, combining the perturbation signal with a current magnitude related to a drive system of the motor or combining the perturbation signal with a power magnitude related to the motor, yielding a combined signal, and sending, based on the combined signal, a flux adjustment signal to adjust a flux of the motor. An apparatus for finding an operating point of an electric motor comprising is also presented.

19 Claims, 5 Drawing Sheets

METHOD AND APPARATUS FOR CONTROL OF ELECTRICAL MACHINES

CROSS-REFERENCE TO RELATED APPLICATIONS

The present application is a continuation of pending International patent application PCT/EP2008/067930 filed on Dec. 18, 2008 which designates the United States and claims priority from Swedish patent application 0801590-1 filed on Jul. 3, 2008, the content of which is incorporated herein by reference.

FIELD OF THE INVENTION

The present invention relates to electrical motors and more specifically to optimized control in relation to electrical motors.

BACKGROUND OF THE INVENTION

When using inverter fed electrical motors, there are various optimum operating points depending on the desirable criteria. For example, in some instances it is desirable to find an operating point requiring as little electrical current as possible, for a given load torque requirement. This is also known as Maximum Torque per Ampere, MTPA. In other instances, it is desirable to find a point of maximum efficiency, ME, (or minimum input active power (kW), where the motor supplies a specific load torque with minimum losses in the machine. Other measurements are equally possible, such as maximum power factor (MPF), minimum input volt amperes (kVA), maximum rate of change of torque (MRT), and maximum torque per voltage (MTPV) control. System ME control where the overall efficiency of motor plus inverter system is of concern.

In the article entitled "Self-tuning of MTPA current vector generation scheme in IPM synchronous motor drives" by S. Bolognani et al., published in conjunction with a conference named EPE 2007, ISBN 9789075815108, page 1-10, it is presented a method of achieving MTPA. The article presents a drive prototype with a current vector generation scheme which can be self-adjusted in "quasi real-time" to the actual maximum torque per amps locus. The article presents a method to achieve an MTPA operating point by injecting a perturbation signal in the phase angle of current preference. By adjusting the current phase around an MTPA point, the MTPA is found where the absolute value of the current is at its minimum.

While it appears as if this method would find an MTPA point, varying the current angle to find an optimum is problematic. The torque of the motor is directly related to the current; hence, the variation as presented above, will generate a significant torque variation. Depending on the application, such a torque variation can be anything from undesirable to devastating for the particular application.

Consequently, there is a problem of increased torque ripple while finding an optimum operating point of motors.

SUMMARY OF THE INVENTION

An object of the present invention is to solve or at least alleviate the problems presented above.

According to one aspect of the invention, it is presented a method for finding an operating point of an electric motor. The method comprises the steps of: generating a perturbation signal; combining the perturbation signal with a current magnitude related to a drive system of the motor or combining the perturbation signal with a power magnitude related to the motor, yielding a combined signal; and sending, based on the combined signal, a flux adjustment signal to adjust a flux of the motor.

Using the embodiments of the invention, an optimum operating point can be found dynamically. Hence, variations in an operating environment can be compensated for without operator input or any new identification runs. For example, if a winding resistance of the motor varies due to temperature variations, this can be compensated for automatically. This leads to more efficient use of the motor and drive system. Moreover, such adjustments are effected using the reference flux of the motor, which, since the flux is not directly linked to the torque, has no or minimal effect on the torque, and therefore also speed, of the motor. It is to be noted that an optimum operating point is a practical optimum, not necessarily being at the exact theoretical or real optimum. Rather, the optimum is found to be in the vicinity of the actual exact optimum point, with only a small discrepancy.

The method can be used not only to find the operating point, but also to run at the operating point.

The perturbation signal may be generated using a pseudo random signal generator or any conventional signal with zero rms (root mean square) value, or a sinusoidal signal.

The steps of generating, combining and sending may be repeated. In this way a continuous control method is achieved to reach an optimum operating point.

The method may end when the current magnitude or the power magnitude is stable. For instance, the stability may be determined as the current magnitude or power magnitude being constant within a margin of error for a specific amount of time. Alternatively, the method runs indefinitely.

By ending the optimisation once there is a stable combined signal, this is likely to be in an optimum point. Consequently, the optimisation can be switched off for the moment and be switched on again if need arises.

The method may end when a reference signal for a torque of the motor changes more than a threshold amount. In other words, when there is a significant change in a reference signal to the motor, the optimisation is switched off to allow the motor to react quickly to the change of condition.

The method may start when an operating point of the motor changes, due to at a factor external to the motor, and a reference signal related to the operating point change is stable. Stability of either of both of the reference signals may be determined as the signal in question being constant within a margin of error for a specific amount of time. Hence, after a change of reference signals and a stable point has been reached for the motor, the optimisation according to this method is turned on.

The external factor may be selected from the group consisting of a torque reference change, a speed reference change or a combination of these.

The method may be started periodically. In other words, an optimum operating point can be found periodically. This can compensate e.g. for changes in winding resistance to internal temperature increase, change in ambient temperature, etc. The period can be adjusted to suit the particular environment. For example, the period can be 30 minutes or an hour, or any time between minutes and hours.

The combining may involve multiplying the perturbation signal with the current magnitude or the power magnitude. The multiplication works due to the different phase relationships of the compared signals above and below the optimum operating point, here defined as an optimum flux magnitude value.

The power magnitude may be obtained as a power of the motor. This can be calculated or estimated from feedback current and/or inverter DC link voltage signals. Calculated powers require no additional sensors, saving cost and component complexity of the solution.

The power magnitude may be obtained as a power of a motor system including a motor, an inverter and a rectifier. By optimising on the power of the entire system, total efficiency can be optimised. This reduces overall energy usage and reduces any heat generation.

The power magnitude may be obtained as a minimum input volt amperes power.

The power magnitude may be obtained at least partly using measurements of current or voltage.

The current magnitude related to the motor may be obtained by measuring currents of the motor.

The current magnitude or the power magnitude signal may be passed through a high pass filter and a low pass filter before being combined with the perturbation signal. The high pass filter and the low pass filter can be replaced by a band pass filter.

The perturbation signal may be passed through a high pass filter and a low pass filter before combining the perturbation signal with the current magnitude signal or the power magnitude signal. The high pass filter and the low pass filter can be replaced by a band pass filter.

The adjustment signal may be output from a proportional integral controller. Alternatively, any controller with an integral part can be used, e.g. a pure integral controller.

A second aspect of the invention is an apparatus for finding an operating point of an electric motor. The apparatus comprises: a perturbation signal generator for generating a perturbation signal; a combiner for combining the perturbation signal with a current magnitude related to a drive system of the motor or combining the perturbation signal with a power magnitude related to the motor, yielding a combined signal; and an adjuster for sending, based on the combined signal, a flux adjustment signal to adjust a flux of the motor.

The apparatus may be arranged to find an operating point of a synchronous reluctance motor.

The apparatus may be arranged to find an operating point of an induction motor. Alternatively, the apparatus may be arranged to find an operating point of a permanent magnet synchronous motor or a permanent magnet assist synchronous reluctance motor (PMaSynRM).

The apparatus may further comprise a direct torque control module for controlling the motor.

The apparatus may further comprise a vector control module for controlling the motor.

A third aspect is a system comprising an apparatus according to the second aspect and an electric motor.

The electric motor may be a synchronous reluctance motor or an induction motor.

It is to be noted that any feature of the first, second and third aspects may, where appropriate, be applied to any other aspect.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION OF THE INVENTION

The present invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Embodiments of the invention cover a plurality of optimisation strategies. Specifically, optimisation can occur to achieve maximum efficiency (ME) at machine or system level (including i.a. inverters), maximum power factor (MPF), minimum input volt amperes (kVA), maximum rate of change of torque (MRT), and maximum torque per voltage (MTPV).

It will now first be described a scenario of optimisation on the basis of MTPA, with reference to FIGS. 1-4. However, the same principle is applicable to all optimisations.

Figure 1:
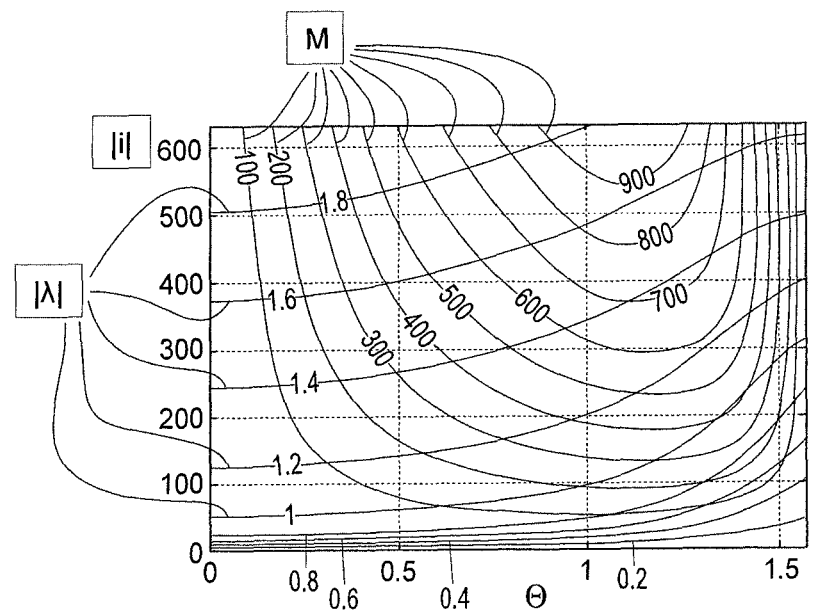
FIG. 1 is an exemplifying graph showing the contour plot of the torque M and the flux magnitude $|\lambda|$ as function of the current magnitude $|i|$ and the current angle $\theta$ for a Synchronous Reluctance Motor.

FIG. 1 shows an exemplifying contour plot of the torque M and the flux magnitude $|\lambda|$, in Vs, as function of the current magnitude $|i|$ and the current angle $\theta$ for a Synchronous Reluctance Motor, also known as SynRM.

To understand the plot, see for example the flux line of 1.4 and the torque line of 500. These two lines cross at two points, creating two potential operating points. However, it is desired to find the lower operating point, requiring less electrical current.

As can be seen the minimum current magnitude for a given torque M, which will be named $|i|_{MTPA}$, is obtained with a unique flux magnitude value, which will be named $|\lambda|_{MTPA}$. If the motor is not working at the MTPA point, the flux magnitude value is different from $|\lambda|_{MTPA}$ is an abbreviation of Maximum Torque per Ampere, i.e. generation of a predetermined level of torque with the minimum current magnitude.

Given a (M, |λ|) couple which defines the motor operating point, a relationship exists between the flux magnitude variation and the current magnitude variation. In particular, three different cases can occur:

Firstly, if |λ| is above the $|λ|_{MTPA}$ value, then a flux magnitude decrease will correspond to a current magnitude decrease, and a flux magnitude increase will correspond to a current magnitude increase. In other words, the phases of the perturbation signal and the input signal do not correspond and a multiplication will result in a curve with a negative derivative, as can be seen in FIG. 2.

Secondly, if |λ| is below the $|λ|_{MTPA}$ value, a flux magnitude decrease will correspond to a current magnitude increase, and a flux magnitude increase will correspond to a current magnitude decrease. In other words, the phases of the perturbation signal and the input signal correspond and a multiplication will result in a curve with a positive derivative, as can be seen in FIG. 3.

Thirdly, if |λ| is exactly equal to the $|λ|_{MTPA}$ value, then a flux magnitude increase or decrease will always cause a current magnitude increase. In other words, a minimum exists, which is an optimisation solution.

Figure 2:
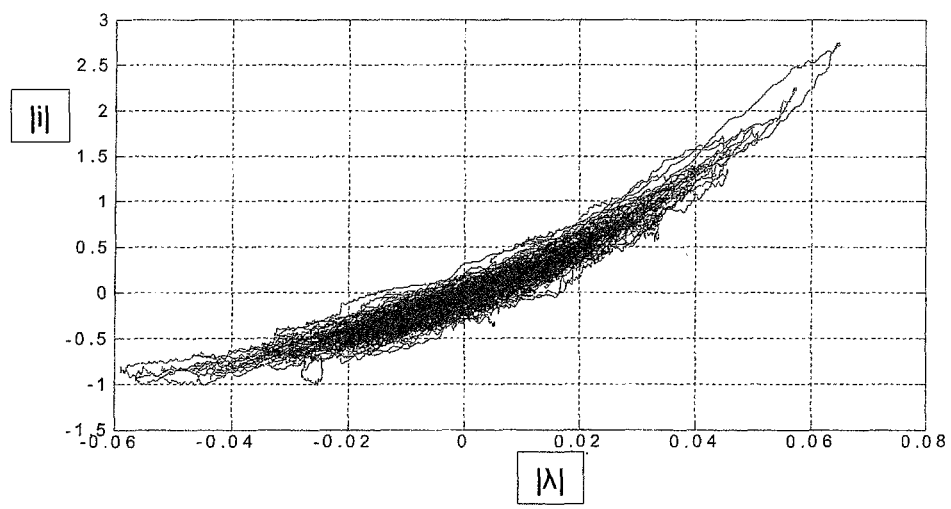
FIG. 2 is a graph over current magnitude variation as function of the flux magnitude variation, in a situation where $|\lambda|$ is above a $|\lambda|_{MTPA}$ value, which is the optimum flux amplitude for MTPA for given operating point.
Figure 3:
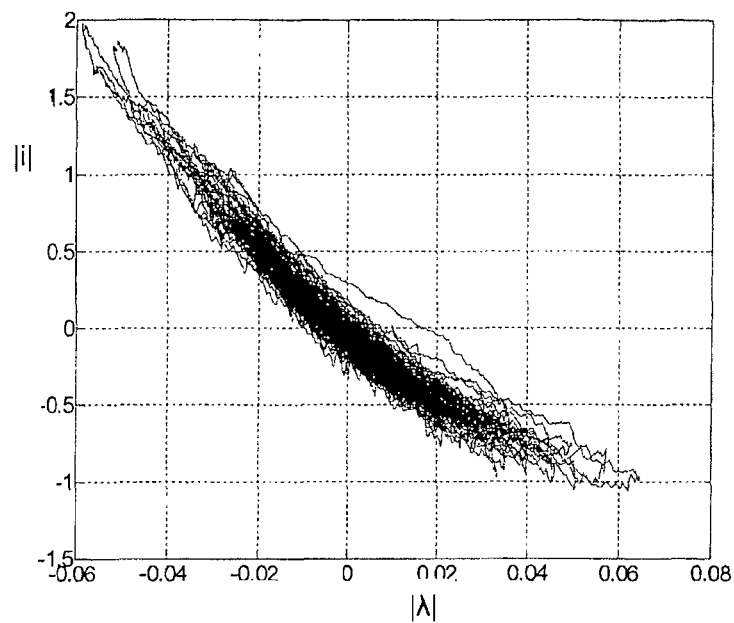
FIG. 3 is a graph over current magnitude variation as function of the flux magnitude variation, in a situation where $|\lambda|$ is below a $|\lambda|_{MTPA}$ value.
Figure 4:
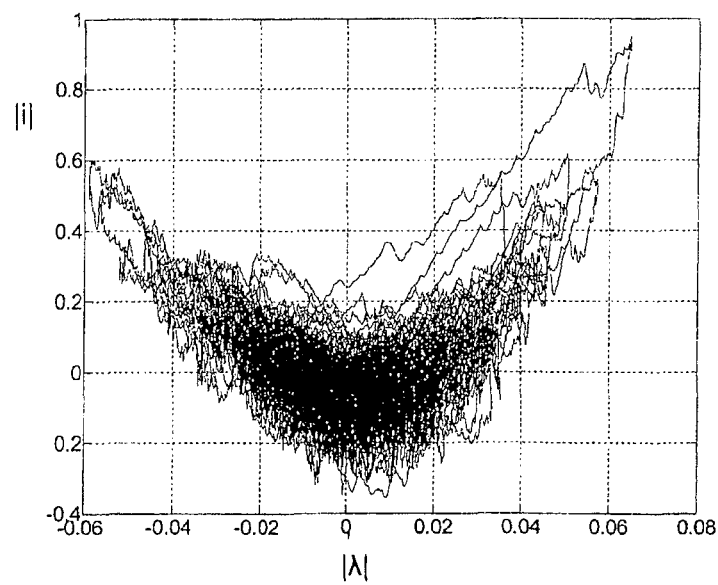
FIG. 4 is a graph over current magnitude variation as function of the flux magnitude variation, in a situation where $|\lambda|$ is in the region of a $|\lambda|_{MTPA}$ value.

In FIG. 2, FIG. 3 and FIG. 4, the current magnitude variation is plotted as function of the flux magnitude variation. The plot has been obtained with a MATLAB/Simulink simulation of a SynRM controlled by a DTC (Direct Torque Control) algorithm, in which the flux level has been forced to vary in a random manner around three different operating points. FIG. 2 shows an example where the flux is above $|λ|_{MTPA}$, FIG. 3 shows an example where the flux is below $|λ|_{MTPA}$ and FIG. 4 shows an example where the flux is in the region of $|λ|_{MTPA}$. In these simulations, the current magnitude was sampled for four seconds.

Figure 8:
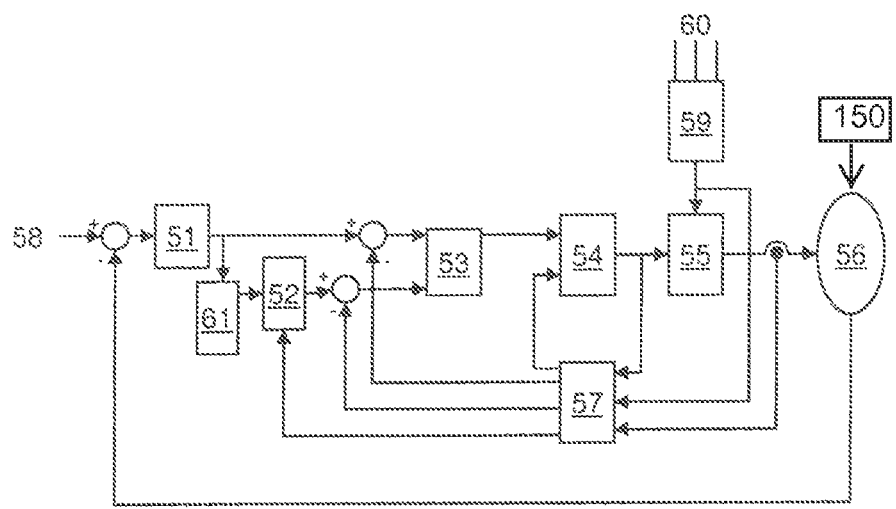
FIG. 8 is a schematic diagram illustrating an environment where the present invention can be applied.

It is clear, from FIGS. 2-4, that some information about the MTPA point can be gathered from a keen on-line analysis of the |λ|-|i| relationship. Below it will be shown a non-intrusive way of retrieving the optimum point, such as an MTPA point, with an automatic on-line procedure which can be easily integrated with DTC algorithms as illustrated in FIG. 8. As explained above, the same method can be used to find the optimum point for various other strategies, not only for MTPA. For example, the control strategies that can be considered are: maximum power factor (MPF) control, maximum efficiency (ME) control and for field weakening region: maximum torque per voltage (MTPV) control.

Figure 5:
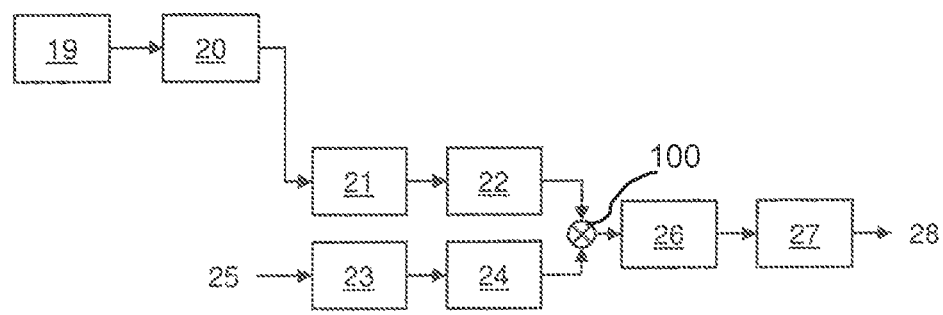
FIG. 5 is a block diagram illustrating an embodiment of an automatic MTPA search algorithm.

Based on the considerations described above, a simple automatic optimum point search algorithm can be implemented, as shown in FIG. 5. By selecting an appropriate input signal 25, the desired optimum point is found. For instance, the input signal 25 can be selected as a current magnitude to optimise on MTPA, as $P_{input}$ to optimise on input power (e.g. at motor or at system level), or the input signal 25 can be selected as a power factor to optimise on power factor.

Instead of using a pure sinusoidal perturbation for the flux reference signal, a pseudo-random signal with uniform distribution is superimposed to |λ|*, which is the reference flux to DTC controller. This fundamental feature has been chosen because a pure sinusoidal signal could be dangerous for the whole drive system. If the load is unknown or only partially modelled, the risk of exactly hitting a mechanical resonance could be a real problem. Consequently, a pseudo-random signal with very high periodicity can be used instead, spreading the harmonic content over a wider frequency range.

There are some limitations in the pseudo-random signal generation. Obviously, the DTC algorithm and the inverter itself cannot reproduce too fast changes in the flux reference signal. That's why the signal perturbation 19 filtered with a first-order low-pass filter 20 with time a constant $T_{perturb}$, i.e. using a filter function of $1/(1+sT_{perturb})$ in filter 20. A filtering action also improves the effectiveness of the disturbance detection in the input signal feedback signal. The output from the low-pass filter 20 is added to the reference for the flux magnitude, |λ|*. Signal perturbation 19 also refers to a pseudo random signal generator.

If a simpler configuration is desired, a sinusoidal perturbation can also be used, with somewhat higher risk for resonance.

A first-order low-pass filter 23 with a time constant $T_{lpf}$ and a first-order high-pass filter 24 with a time constant $T_{hpf}$ are used respectively to remove the DTC ripple and the mean value on the input signal 25. The filter function of filter 23 can thus be expressed as $1/(1+sT_{lpf})$ and the filter function of filter 24 can be expressed as $sT_{hpf}/(1+sT_{hpf})$ The same filters are applied to the perturbation signal, in order to keep the same phase relationship between the two signals. In other words, filter 21 is equivalent to the filter 23 and the filter 22 is equivalent to filter 24, i.e. having the same time constants, respectively. Then there is a multiplication of the two filtered signals and filtering action with the first-order low-pass filter 26 of time constant $T_{detect}$, i.e. using a filter function of $1/(1+sT_{detect})$ in filter 26. The last part of the detector is a PI controller 27 which generates a compensation signal 28 which is added to the flux magnitude reference signal. This detector, or any other kind of demodulator in hardware or software, thus allows an optimum to be found. Combiner 100 is also shown in FIG. 5.

The detector can be run continuously or the detector can be switched on only when necessary, to avoid a resulting ripple of the flux. Moreover, the detector can store optimum operating points for a particular machine in memory (see 61 in FIG. 8), whereby if similar conditions are detected in the future, such an optimum operating point is a good starting point to find a new optimum operating point. Under the assumption that the motor has not changed, this will significantly reduce the time which is required to find a new operating point.

Figure 6:
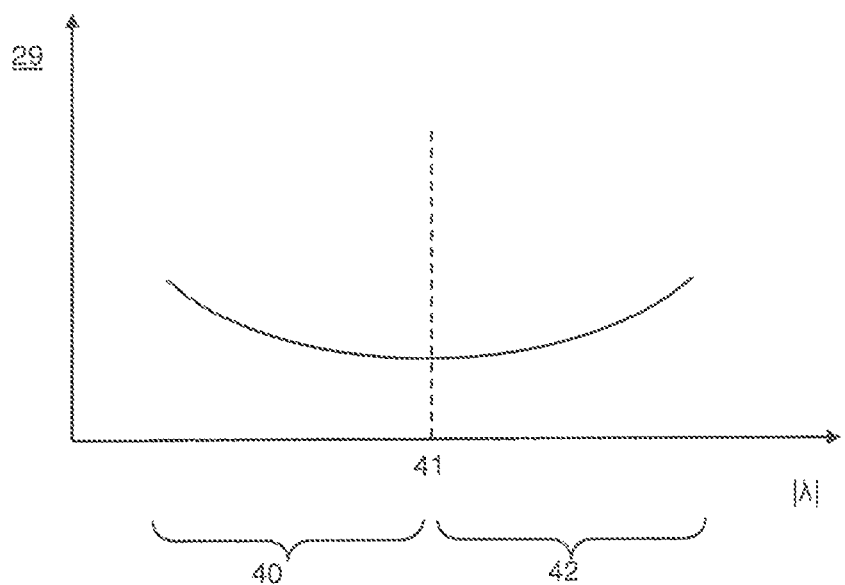
FIG. 6 is a schematic graph showing the current magnitude $|i|$ as a function of the flux magnitude $|\lambda|$, essentially corresponding to FIGS. 2-4.

FIG. 6 is a schematic graph showing the optimisation signal 29 at the output of the low-pass filter 26, as a function of the flux magnitude |λ|. An optimum can be seen at flux magnitude point 41, where the optimisation signal 29 is at a minimum.

As explained in conjunction with FIGS. 2-4 above, it has been found that when the operating point is below the optimum flux point, i.e. in region 40, the variation in the current is in phase opposition to the injected perturbation signal. The opposing signs of the signal results in a multiplied signal which has a negative mean value. On the other hand, when the operating point is above the optimum flux level, i.e. in region 42, the current variation is in phase with respect to injected perturbation signal in flux reference; this results in the multiplication having positive mean value.

When the flux reference is at or very near to the optimum point 41, the product amplitude is very small or zero (ideally). The PI regulator can be used to integrate this error signal to obtain a compensation signal which can be subtracted from the flux reference as shown in FIG. 5. This allows for the control structure of FIG. 5 to find the optimum point using a relatively simple structure. It is to be noted that any other suitable regulator with dominating integrating characteristics can be used.

This solution can be used to find the optimum point for many different strategies. For example, the control strategies that can be considered are: maximum torque per ampere control (MTPA), maximum power factor (MPF) control, maximum efficiency (ME) control, Maximum torque per kVA (MTPkVA) and for field weakening region: maximum torque per voltage (MTPV) control.

Figure 7A:
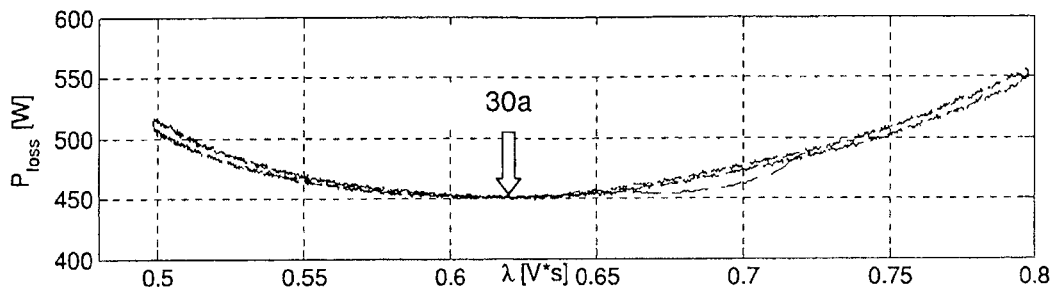
FIGS. 7a-c are three exemplifying graphs showing variation of various measurements when the flux reference is varied around the nominal operating point for a synchronous reluctance machine, where FIG. 7a relates to total power loss, FIG. 7b relates to power factor and FIG. 7c relates to current.
Figure 7B:
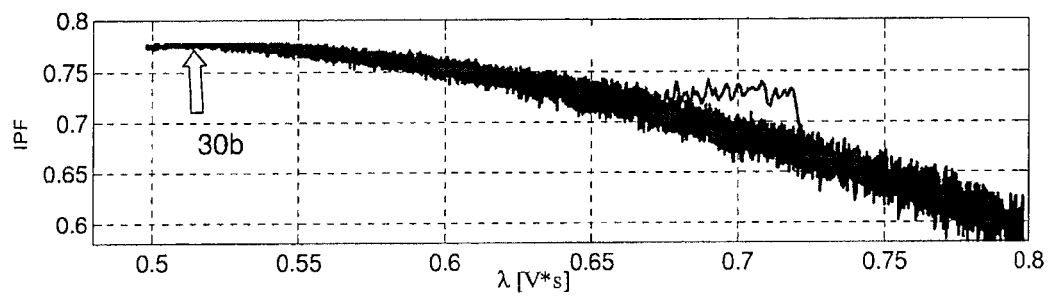
Figure 7C:
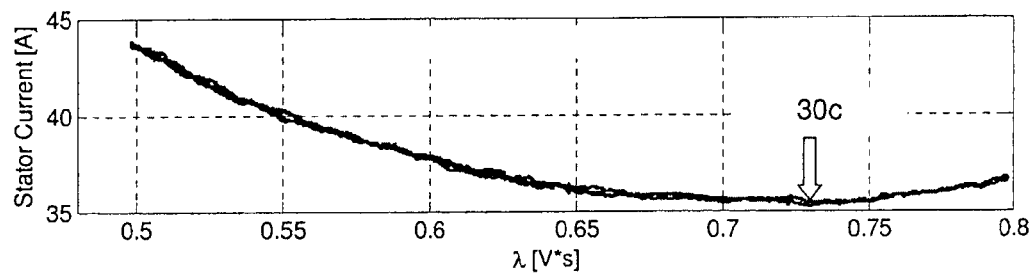

The perturbation based optimization can also be applied to these schemes provided that the parameters for the synchronous reluctance machine being optimized have minima with respect to flux variation. FIGS. 7*a-c* are three exemplifying graphs showing the variation of various measurements when the flux reference is varied around the nominal operating point for a synchronous reluctance machine. FIG. 7*a* relates to total power loss, FIG. 7*b* relates to power factor and FIG. 7*c* relates to current. It is to be noted that also internal power factor IPF can be used for optimisation.

It is to be noted that it is not necessary, but still possible, to adjust the time constants in accordance with the type of optimum to be found.

In FIG. 7*a*, the optimum for power loss can be found at point 30*a*, in FIG. 7*b*, the optimum for power factor, being a maximum, can be found at point 30*b*, and in FIG. 7*c* the optimum for current.

Hence, using the configuration of FIG. 5 above, by selecting an appropriate input signal 25, the desired optimum point is found.

Specifically, for MTPA, the input signal 25 is selected as the input current. For power optimisation, the input signal 25 is selected as $P_{loss}$, which for example can be calculated as:

$$P_{loss} = P_e - P_m \quad (1)$$

Analogously, the input signal 25 can be selected as $P_{input}$ to optimise on input power (e.g. at motor or at system level), or the input signal 25 can be selected as a power factor to optimise on power factor.

It is to be noted that parameters needed for the above inputs can be calculated, measured, estimated or a combination of these strategies in order to obtain a value. This includes the actual input values such as $|I_s|$ and $P_{loss}$, i.e. the formula shown herein are only an exemplary way of obtaining the values.

FIG. 8 is a schematic diagram illustrating an environment where the present invention can be applied, including a direct torque control system. A reference angular velocity $\omega^*$ 58 is fed to the system. The reference angular velocity $\omega^*$ 58 is compared with an actual angular velocity w and the difference is fed to a speed controller 51. The speed controller 51 outputs a reference torque M* which is compared to an estimated torque M and the difference is fed to a torque and flux magnitude comparator 53. The torque and flux magnitude comparator 53 feeds reference values for torque M and flux magnitude $|\lambda|$ to an optimum switching logic module 54. Using these values and an input of $|\lambda|_{sextant}$, switching signals $S_{abc}$, e.g. pulse width modulation (PWM) signals, are sent to an inverter 55. The inverter 55 effects the switching using DC power coming from a rectifier 59. The rectifier 59 converts AC power 60 from the general power grid (typically three phase power) to DC power. The output of the inverter 55 is thus used to power a motor 56. The motor 56 can be a synchronous reluctance motor or an induction motor or PMSM or permanent magnet assist SynRM. Also shown in FIG. 8 is direct torque control module/vector control module 150.

It is to be noted that the present invention can also be embodied in a system using vector control for controlling the motor.

A torque and flux magnitude estimator 57 uses three inputs to estimate torque M and flux magnitude $|\lambda|$. Firstly, the switching signals $S_{abc}$ are obtained from the optimum switching logic module 54. Secondly, a voltage of the DC source $U_{DC}$ is obtained from the input to the inverter 55. Finally, a measured three phase current $I_{abc}$ as supplied to the motor 56 is obtained. Apart from supplying estimates of torque M and flux magnitude $|\lambda|$, the torque and flux magnitude estimator 57 also provides inputs to an optimum operating point controller 52. Specifically, torque and flux magnitude estimator 57 supplies a current magnitude $|i|$, a power loss value $P_{loss}$, an input power value $P_{input}$, and an internal power factor value IPF. Additionally, the optimum operating point controller 52 receives a reference torque M* from the speed controller 51. Optionally, this reference torque M* is stored in a memory 61 when an optimum operating point has been reached. This torque reference M* can thus be used as a starting point for finding a new operating point.

In this embodiment, the modules of FIG. 5 are located in the optimum operating point controller 52. The output of the optimum operating point controller 52, which is the optimum flux value, is combined with the flux estimate as an input to the torque and flux comparator 53. Analogously, and as mentioned above, the torque reference M* of the speed controller, is combined with the torque estimate M as a second input to the torque and flux comparator 53.

Here now follows a discussion regarding how the optimisation is started and ended. Generally, the optimisation is repeated until the optimum operating point of choice is found. The optimisation can then end when the combined signal 25 is stable. The stability of the input signal 25 can be determined as the input signal 25 being constant within a margin of error for a specific amount of time. Alternatively, the stability of the input signal 25 can be determined as the derivative of the input signal being less than a threshold derivative.

By ending the optimisation once there is a stable input signal 25, an optimum point has been reached. Consequently, the optimisation is switched off for the moment and switched on again when needed at a later time.

Another point when optimisation can be switched off is if the reference signals change significantly. For example, the optimisation is ended when the reference signal for the torque or speed of the motor changes more than a threshold amount. By switching off the optimisation when there is a change in reference signals, the motor is allowed to react quickly to the change of condition.

Once a stable point has been reached after the change in reference signal, optimisation can be switched on to find an optimum operating point. The stable point can be determined as either or both of the torque and speed reference signals being stable.

In one embodiment, the optimisation can be started periodically, finding an optimum operating point periodically. This can compensate e.g. for changes in temperature due to internal resistance, change in ambient temperature, etc. The period can be adjusted to suit the particular environment. For example, the period can be 30 minutes or an hour, or any time between 1 minute and 3 hours.

It is to be noted that the solution described above is applicable not only to synchronous reluctance motors, but also to permanent magnet synchronous motors and to induction motors. Moreover, the solution described above can equally be applied to appropriate measurements for generators.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A method for finding an operating point of an electric motor comprising the steps of:

generating a perturbation signal using a pseudo random signal generator;

combining said generated perturbation signal with a current magnitude related to said motor or combining said perturbation signal with a power magnitude related to a drive system of said motor, yielding a combined signal, wherein said power magnitude is obtained at least partly using measurements of current or voltage, and wherein said power magnitude is obtained as a minimum input volt amperes power; and sending, based on said combined signal, a flux adjustment signal to adjust a flux of said motor.

2. The method of claim 1, wherein said steps of generating, combining and sending are repeated.

3. The method of claim 2, wherein said method ends when said current magnitude or said power magnitude is stable.

4. The method of claim 1, wherein said method ends when a reference signal for a torque of said motor changes more than a threshold amount.

5. The method of claim 1, wherein said method is started when an operating point of said motor changes, due to an external factor to said motor, and a reference signal related to said operating point change is stable.

6. The method of claim 5, wherein said external factor is selected from the group consisting of a torque reference change, a speed reference change or a combination of these.

7. The method of claim 1, wherein said method occurs periodically in an electric motor.

8. The method of claim 1, wherein said combining involves multiplying said perturbation signal with said current magnitude or said power magnitude.

9. The method of claim 1, wherein said power magnitude is obtained as a power input of said motor.

10. The method of claim 1, wherein said power magnitude is obtained as a power input of a motor system including a motor, an inverter and a rectifier.

11. The method of claim 1, wherein said power magnitude is a power factor.

12. The method of claim 1, wherein said current magnitude related to said motor is obtained by measuring currents of said motor.

13. The method of claim 1, wherein said current magnitude or said power magnitude signal is passed through a high pass filter and a low pass filter before being combined with said perturbation signal.

14. The method of claim 1, wherein said perturbation signal is passed through a high pass filter and a low pass filter before combining said perturbation signal with said current magnitude signal or said power magnitude signal.

15. The method of claim 1, wherein said adjustment signal is output from a proportional integral controller.

16. An apparatus for finding an operating point of an electric motor comprising:

a pseudo random perturbation signal generator for generating a perturbation signal;

a combiner for combining perturbation signals generated by said pseudo random perturbation signal generator with a current magnitude related to said motor or combining said perturbation signal with a power magnitude related to a drive system of said motor, yielding a combined signal wherein said power magnitude is obtained at least partly using measurements of current or voltage and wherein said power magnitude is obtained as a minimum input volt amperes power; and an adjuster for sending, based on said combined signal, a flux adjustment signal to adjust a flux of said motor.

17. The apparatus of claim 16, further comprising a direct torque control module.

18. The apparatus of claim 16, further comprising a vector control module.

19. A system comprising:

a pseudo random perturbation signal generator for generating a perturbation signal;

a combiner for combining perturbation signals generated by said pseudo random perturbation signal generator with a current magnitude related to a motor or combining said perturbation signal with a power magnitude related to a drive system of said motor, yielding a combined signal wherein said power magnitude is obtained at least partly using measurements of current or voltage and wherein said power magnitude is obtained as a minimum input volt amperes power;

an adjuster for sending, based on said combined signal, a flux adjustment signal to adjust a flux of said motor to approach an optimum operating point.

* * * * *